United States Patent
Mulhearn et al.

(10) Patent No.: US 9,787,644 B2
(45) Date of Patent: Oct. 10, 2017

(54) SYSTEM AND METHOD FOR MACHINE-TO-MACHINE PRIVACY AND SECURITY BROKERED TRANSACTIONS

(71) Applicant: Mobile Search Security LLC, Purchase, NY (US)

(72) Inventors: Patrick F. X. Mulhearn, Rye, NY (US); Francis J. Hearn, Jr., New York, NY (US)

(73) Assignee: Mobile Search Security LLC, Harrison, NY (US)

( * ) Notice: Subject to any disclaimer, the term of this patent is extended or adjusted under 35 U.S.C. 154(b) by 0 days.

(21) Appl. No.: 14/020,325

(22) Filed: Sep. 6, 2013

(65) Prior Publication Data

US 2014/0108381 A1    Apr. 17, 2014

Related U.S. Application Data

(60) Provisional application No. 61/712,483, filed on Oct. 11, 2012.

(51) Int. Cl.
*G06F 17/30* (2006.01)
*H04L 29/06* (2006.01)
*H04W 4/00* (2009.01)

(52) U.S. Cl.
CPC ...... *H04L 63/0407* (2013.01); *H04L 63/0421* (2013.01); *H04W 4/005* (2013.01)

(58) Field of Classification Search
None
See application file for complete search history.

(56) References Cited

U.S. PATENT DOCUMENTS

| | | | |
|---|---|---|---|
| 6,249,805 B1 * | 6/2001 | Fleming, III | 709/206 |
| 6,819,932 B2 | 11/2004 | Allison et al. | |
| 7,305,231 B2 | 12/2007 | Strunk | |
| 7,558,562 B2 | 7/2009 | Strunk et al. | |
| 8,027,695 B2 | 9/2011 | Zabawskyj et al. | |
| 8,259,623 B2 | 9/2012 | Momtahan et al. | |

(Continued)

FOREIGN PATENT DOCUMENTS

| | | |
|---|---|---|
| CN | 101030290 | 9/2007 |
| CN | 102365630 | 11/2016 |
| EP | 1853029 A1 | 11/2007 |
| EP | 1879345 A1 | 1/2008 |
| EP | 2104309 A1 | 9/2009 |

OTHER PUBLICATIONS

Application No. 13845083.8 European Patent Office, Communication—European Search Report. dated Jun. 16, 2016. (8 pages).

(Continued)

*Primary Examiner* — Hung Q Pham
(74) *Attorney, Agent, or Firm* — White and Williams LLP

(57) ABSTRACT

A machine-to-machine secure messaging system permits a first machine to send a message to a second machine, despite not knowing the addressing information (e.g., telephone number, IP address or other identifier) associated with the second machine. The system comprises an intermediary server with access to a database with information linking addressing information with other information related to the device, e.g., owner name, operator name and job title, etc., and facilitates a secure communication without the need for either party to the communication to know the other party's addressing information.

23 Claims, 4 Drawing Sheets

(56) References Cited

U.S. PATENT DOCUMENTS

| | | | |
|---|---|---|---|
| 8,325,904 B2 | 12/2012 | Bates et al. | |
| 2002/0178224 A1* | 11/2002 | Kasajima | H04L 12/2803 709/206 |
| 2004/0151300 A1 | 8/2004 | Marwell et al. | |
| 2004/0203713 A1* | 10/2004 | Strunk | 455/422.1 |
| 2008/0070550 A1 | 3/2008 | Hose | |
| 2008/0114884 A1 | 5/2008 | Hewes et al. | |
| 2008/0125101 A1* | 5/2008 | Bakos | H04M 1/72569 455/418 |
| 2008/0294556 A1 | 11/2008 | Anderson | |
| 2009/0313345 A1 | 12/2009 | Dollar et al. | |
| 2010/0030858 A1* | 2/2010 | Chasin | 709/206 |
| 2011/0154022 A1 | 6/2011 | Cheng et al. | |
| 2011/0202151 A1* | 8/2011 | Covaro et al. | 700/90 |
| 2011/0238647 A1 | 9/2011 | Ingram et al. | |
| 2011/0268106 A1 | 11/2011 | Dalton, Jr. et al. | |
| 2012/0084831 A1 | 4/2012 | Hu et al. | |
| 2013/0081113 A1* | 3/2013 | Cherian | G06F 15/177 726/4 |
| 2013/0095889 A1* | 4/2013 | Nguyen et al. | 455/557 |

OTHER PUBLICATIONS

Peterson J., Standards Track, A Privacy Mechanism for the Session Initiation Protocol (SIP) Nov. 2002 (22 pages).

Rosenberg J., Identity Privacy in the Session Initiation Protocol (SIP) Jul. 2005 (17 pages_.

International Application No. PCT/US2013/059934, International Filing Date Sep. 16, 2003. Notification of Transmittal of the International Search Report and The Written Opinion of the International Searching Authority, or the Declaration (9 pages).

Chilean Application No. 2015-000907; Filing Date Apr. 10, 2015, based on International Application No. PCT/US2013/059934 dated Sep. 16, 2013. Office Action dated Aug. 30, 2016 (6 pages).

Colombian Application No. 15106621; Filing date May 11, 2015, based on International Application No. PCT/US2013/059934 dated Sep. 16, 2013. Office Action dated Jan. 23, 2017 (8 pages).

Colombian Application No. 15106621; Filing date May 11, 2015, based on International Application No. PCT/US2013/059934 dated Sep. 16, 2013. Office Action dated Sep. 23, 2016 (19 pages).

Eurasian Application No. 201590530; Filing date Apr. 8, 2015, based on International Application No. PCT/US2013/059934 dated Sep. 16, 2013. Office Action dated Aug. 31, 2016 (1 page).

Australian Application No. 2013330342; Filing date Sep. 16, 2013, based on based on International Application No. PCT/US2013/059934 dated Sep. 16, 2013. Patent Examination dated Nov. 22, 2016 (3 pages).

Chinese Patent Application No. 201380064663.3; Issue Serial No. 2017022201537790; Issue Date: Feb. 27, 2017 Applicant: Mobile Search Security LLC. Title: System and Method for Machine-To-Machine Privacy and Security Brokered Transactions. Notification of the First Office Action. (English translation).

* cited by examiner

SYSTEM AND METHOD FOR MACHINE-TO-MACHINE PRIVACY AND SECURITY BROKERED TRANSACTIONS

PRIORITY AND RELATED PATENTS

This application claims priority to U.S. Provisional Patent Application Ser. No. 61/712,483, entitled MACHINE TO MACHINE PRIVACY BROKERED TRANSACTIONS, filed on Oct. 11, 2012, the full disclosure of which is incorporated herein by reference in its entirety.

BACKGROUND

Growth of Machine-to-Machine ("M2M") Communications.

M2M communications are messages or notifications between devices which are not specifically initiated by the owner or operator of the device, but may occur for a number of reasons such as routine updates and checks, responses to change in the environment, or user action. It is anticipated that, with the growth of smart devices in use, there will be a simultaneous growth in machine-to-machine transactions per year. Mobile devices or machines with unique identifiers which may be encrypted, obscured, obfuscated or otherwise undiscoverable, and which may or may not be numerical, will have reason to independently reach out to other mobile devices or machines with such identifiers. A secure brokering system would allow the communication to occur while maintaining privacy.

Need for Privacy in M2M.

Presently, subscribers to wireless telephone services expect that their contact information (including their telephone number) will be maintained confidentially. Subscribers do not want to receive unsolicited calls on their mobile or cell phone, for instance, from telemarketers. This fact is recognized by wireless carriers, as mobile or cellular telephone numbers remain unpublished, for the most part. However, more machines than merely what we presently think of as telephones will have identifiers similar to cellular telephone numbers, which will be used to communicate with other such devices. More of these machines will be consumer machines, for example refrigerators, and in a similar way to their cell phones, consumers will demand privacy and, in particular, the ability to receive desired messages but also to avoid unsolicited commercial or malicious messages being sent to the devices they own. Companies will also wish to protect the addresses of machines in order to reduce the chance of attack or accidental damage.

Presently, for one machine to connect to another it must know either a physical address, such as the IP address or telephone number, or an assigned name for a machine, such as a domain name, which would in turn reveal the IP address. In the case of systems with only a physical address, the management and storage of these physical addresses across all machines that need to know the particular addresses results in a heavy workload for these machines.

Where a Name System exists (e.g., the internet Domain Name System, which translates an IP address into an easier to remember name such as "www.stamps.com") the problem is simplified somewhat by making it possible to change the physical machine or the physical address to which the name directs. In both cases, however, it is necessary to deal with updating each connecting device with names that change and the distribution of these names to third parties continues to be a significant burden. Furthermore, identifying devices even by a domain name address can render the device, and other devices along the same domain name, vulnerable to attack. Accordingly, a secure system using a broker which can identify destination machines by characteristics such as ownership or location, rather than by name, is desirable.

Presently, machines decide to accept or reject connections based on the origin machine knowing a secret, e.g., a passphrase or key. However secrets must be distributed in advance and revoked in case of a breach. Prior art systems also can infer the legitimacy of the connection based on its apparent network identifier. However, apparent network identifiers can be fraudulently generated, as keys and certificates can be copied. Accordingly, a system using a broker to vouch for the legitimacy of the connection at the time of the connection, rather than at some prior time when creating something such as a certificate or a key, would be desirable.

SUMMARY

A machine-to-machine secure messaging system permits a first machine to send a message to a second machine, despite not knowing the addressing information (e.g., telephone number, IP address or other identifier) associated with the second machine. The system comprises an intermediary server with access to a database with information linking addressing information with other information related to the device, e.g., owner name, operator name and job title, etc., and facilitates a secure communication without the need for either party to the communication to know the other party's addressing information.

In accordance with one aspect of the invention, a method of sending a message from a first machine to a second machine is disclosed. The first machine does not know the addressing information (e.g., the IP address, the phone number, etc.) of the second machine. The message includes sender information, recipient information and a message payload. The sender information relates to the identity of the first machine. The recipient information does not include addressing information for either the second machine or any person or entity owning or controlling the second machine. The method includes the steps of composing the message at the first machine for delivery to the second machine, transmitting the message to an intermediary server, the intermediary server in communication with a database containing, for a plurality of machines, machine characteristic information, machine addressing information and at least one security rule, querying the database comparing the recipient information to the machine characteristic information to identify the second machine, and transmitting the message payload to the second machine when the security rule associated with the second machine permits the transmission of the message.

In one aspect of the invention, the sender information includes sender owner information. In one aspect of the invention, the sender information includes information relating to the geographic location of the first machine.

In one aspect of the invention, the recipient information includes recipient owner name information. In one aspect of the invention, the recipient information includes recipient operator name information. In one aspect of the invention, the recipient information includes recipient job title information.

In one aspect of the invention, the machine addressing information is a telephone identifier. In one aspect of the invention, the machine addressing information is from the group consisting of: an Internet Protocol address, a MAC address and a network name.

In one aspect of the invention, the intermediary server is controlled by a wireless telephone carrier.

In one aspect of the invention, the intermediary server is an industry clearinghouse. In this aspect, the database can be controlled by a clearinghouse provider or by a wireless telephone carrier.

In one aspect of the invention, the sender information further includes continuing contact information sufficient to enable the second machine to send a message to the first machine. In this aspect of the invention, the continuing contact information can be a permanent telephone identifier, a temporary telephone number, or a proxy for further communication.

In one aspect of the invention, the security rule lists the sender information for approved senders authorized to send messages to the second machine.

In one aspect of the invention, the machine characteristic information relates to the owner of the machine. In one aspect of the invention, the machine characteristic information relates to the identity of the user of the machine. In one aspect of the invention, the machine characteristic information relates to work information relating to a user of the machine. In one aspect of the invention, the machine characteristic information relates to the geographic location of the machine.

In one aspect of the invention, the security rule lists times when messages can be delivered. In one aspect of the invention, the security rule lists one or more locations such that the machine will only accept messages when at a listed location.

This SUMMARY is provided to briefly identify some aspects of the present disclosure that are further described below in the DESCRIPTION. This SUMMARY is not intended to identify key or essential features of the present disclosure nor is it intended to limit the scope of any claims.

The term "aspects" is to be read as "at least one aspect". The aspects described above and other aspects of the present disclosure described herein are illustrated by way of example(s) and not limited in the accompanying figures.

BRIEF DESCRIPTION OF THE DRAWINGS

A more complete understanding of the present disclosure may be realized by reference to the accompanying figures in which.

DESCRIPTION

Figure 1:
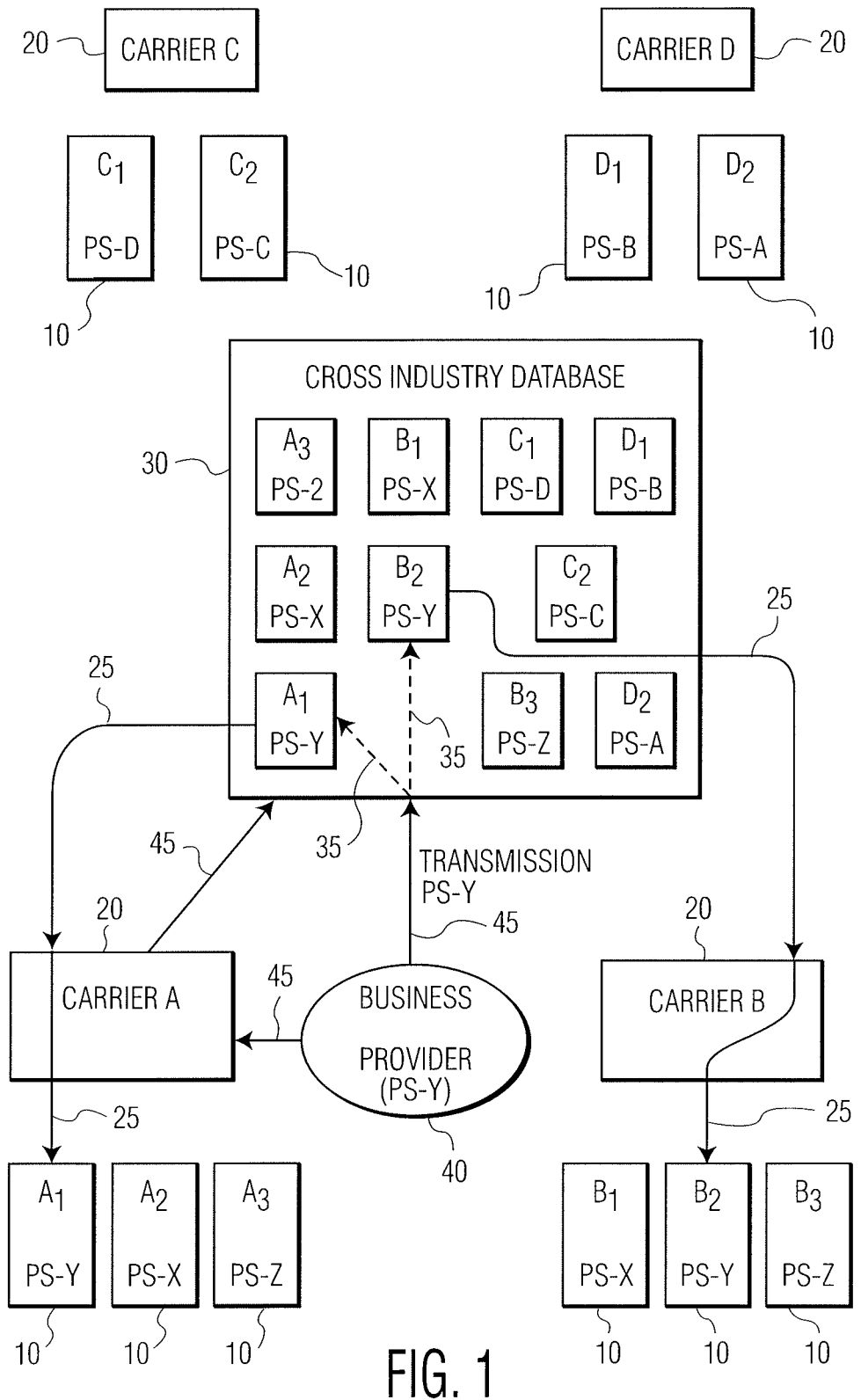
FIG. 1 is a depiction of the architecture according to an aspect of the present invention.

The present invention defines a system and method enabling a mobile or non-mobile device/machine to communicate with another mobile or non-mobile device/machine in an automated, privacy-protected and brokered transaction. A mobile or non-mobile device/machine subscriber would set specific privacy-protected access standards for its own mobile or non-mobile device/machine through its wireless provider and/or a consortium of wireless providers (including, but not limited to an industry clearinghouse) to allow transactional access to/from other mobile or non-mobile devices/machines or subscribers. The wireless providers or a clearinghouse would facilitate transactions on either a defined geographic or global basis.

An issue of growing importance relates to private and secured machine-to-machine communications. As technology develops, the importance of machine-to-machine communications will be become more significant. An aspect of the present invention is a system for enabling such machine-to-machine communications. The system includes an option of contacting a wireless subscriber through an encrypted channel. Such an option is just one example of an advancement in the art.

The present invention relates to a registration-based, machine-to-machine, messaging system that, as an option, enables the transmission of an electronic message to an unpublished, wireless mobile or nonmobile device/machine of a subscriber. This system requires the direct participation of a wireless carrier and/or an industry clearinghouse, either of which maintains a database of wireless contact information (including, but not limited to, telephone numbers, encrypted identifiers and other identifying information) of the subscriber. It will be recognized that the system can be implemented by a particular wireless service provider, or by a consortium of wireless service providers, with or without the participation of an umbrella entity, such as an industry clearinghouse. For ease of description the following narratives will describe situations in which a specific wireless service provider is performing the steps of the messaging service, but it should be understood that an umbrella organization, such as an industry clearinghouse, can perform the steps with the cooperation of one or more wireless service providers.

The machine-to-machine messaging system is initiated with an input received by the wireless carrier. Protocols for the format of the input are established in advance and are known to the sender of the electronic message. The format of the incoming message is designed to enable the database system to evaluate the incoming message in accordance with subscriber-defined criteria. The subscriber-defined criteria can be described as a series of one or more "if, then statements" or "rules" that precisely defines a sequence of operations. Through the evaluation of the incoming message, according to subscriber-defined rules, an action may be dictated through the database system.

For example, the application of subscriber-defined rules to an incoming message may dictate the message be sent to a specific subscriber whose wireless contact information is maintained in the database of wireless contact information described above. In such a case, provided the subscriber-defined rules dictate that this message be sent, the message (e.g., text or SMS message, wireless signal, voice message or a data stream authorizing action by the receiving device or machine, such as an update of the encryption codes) will be sent, machine-to-machine, with no direct human involvement.

This present invention recognizes that, increasingly, communications will be executed exclusively between multiple mobile or non-mobile devices/machines without direct user action. Because of the lack of direct user action; that is, because a user may not or may not be able to regulate the flow of incoming information to a user's mobile or non-mobile device/machine (or, at the very least, cannot regulate the flow of information continually short of allowing all or none of the information through), a user may want to enter into a subscription or other arrangement with an individual wireless provider, group of operators or the entire industry, nationally or globally, wherein the wireless provider (or providers) screens or filters the information in accordance with the user's predefined privacy or security criteria or protocol. In this regard, the present invention is directed towards a directory service system and a method for enabling a mobile or non-mobile device/machine to communicate with one or more other mobile or non-mobile devices/machines in an automated, secure, privacy-protected or privacy-brokered transaction. The privacy or security criteria may be predefined and modified as necessary by the user.

In an aspect of a method of the present invention, a subscription service (for example, a wireless service provider or a third party industry representative or clearinghouse) would enter into a contracted agreement with a subscriber wherein the subscriber set criteria under which identified third parties be allowed to access the subscriber's mobile or non-mobile devices/machines. Machines in many operational contexts may be programmed to send messages to other machines based on the occurrence of one or more events, without any intervention from a human user of the sending machine at the time of sending. In one aspect, this is not a traditional message sent via human interaction with the machine. It is instead, an automated message sent because some logic programmed into the machine dictates that a message must be sent.

For example, an automobile can be equipped with messaging-capable circuitry, comprising logic to send messages when certain events occur that are consistent with the car having been stolen. By way of further example, a piece of construction equipment can be embedded with messaging-capable circuitry including programming logic instructing the machine to send a message to a particular individual or company when certain conditions are reached such as a particular temperature, or the completion of a task. By way of further example, a refrigerator can be equipped with messaging-capable circuitry including programming logic instructing the machine to send a message when supply of a certain grocery item is low.

In one further example, a company owns a fleet of heavy construction equipment, including bulldozers, cranes, and smaller tools. Each one is fitted with a small cellular-based system to aid in tracking and recovery. Because the company provides equipment to construction sites all over the country, it needs to be able to use local security companies to track and recover its equipment. However, it does not wish to give out permission to remotely manage equipment to more people than necessary. The traditional solution to this problem would be a laboriously, updated list of access permissions, with tracking numbers (e.g., cellular telephone numbers or other similar identifiers) for the tracking equipment in each piece of equipment distributed to the appropriate security company. However, in accordance with the present invention, the company can register with the clearinghouse instead. The company can grant each security company permission to access "company equipment reported as missing from construction sites within the security company's operating area." Then, when a piece of equipment is reported missing, either manually reported or reported as having left a geo-fenced area, the security company can send a message to the company via the clearinghouse. Access is granted immediately based on the established rules, without having to know the equipment's logical location. The security company can query the location, stop the engine, or take other steps to recover the missing equipment.

By way of further example, a customer installs a new smart smoke detector. One of its smart features is the ability to notify you if smoke is detected in your house, and provide pictures from its built in camera to let you determine if it is a false alarm. Normally, the customer would have to configure such a smart detector, to tell it which device it should contact in the case of emergency. However the customer's cellular provider provides M2M Clearinghouse service. Then, when smoke is detected, the smart device queries the M2M service to find any cell phones that the customer owns, and can send messages to those devices without knowing the particular phone number. The recipient's cellular carrier authenticates that the owners of both devices are the same by checking, e.g., the billing records. Because of this assurance, the smart detector can send photos of the incident to provide reassurance; in this case, the photos show the customer's son is simply burning toast in the kitchen and so the customer can remotely deactivate the alarm.

By way of further example of the utility of the present invention, a company is installing traffic survey equipment throughout a small town. The devices count cars and send reports to the smartphones of field engineers. Because the devices are small and expensive they are sometimes stolen. Previously, it was necessary for them to contain the cell phone numbers of the field engineers in order to send the messages to those phones. This presented a privacy problem as these numbers could potentially be extracted from the stolen devices. However, if the company's cellular provider provides M2M Clearinghouse service, then, rather than storing the recipient's number on the device, the device can send messages to "field engineers at the company." The M2M Clearinghouse authenticates the device based on the owner of the SIM card, and uses a pre-defined algorithm to determine the intended recipients based on their job title. The algorithm may be configured to send the information to all engineers, ones that are closest to the sender, the one who has had the least messages recently, or some other arrangement. Because this look up is done in real time, there is no need to maintain the permissions on the device. As engineers join and leave the company, the M2M Clearinghouse will automatically update the list of recipients.

By way of further example, a customer obtains a second-hand smart refrigerator and wants to take advantage of its "low milk alert" feature a smartphone app which tracks how much milk you have in your refrigerator, so you can decide if you want to buy more when you are at the store. Normally, the consumer would have to configure the smart phone, to tell it the address of the refrigerator he or she wants to query, and also the refrigerator, to tell it which phones are allowed access to milk information. However, if the customer's cellular provider provides M2M Clearinghouse service in accordance with the present invention, then, when the customer launches the "low milk alert" app, it automatically queries the M2M service to find any refrigerators belonging to the customer (that is, connected to a cellular or data service that the customer owns). The M2M service identifies that a refrigerator is connected to the customer's home broadband connection. The "low milk alert" app is given permission to connect to that refrigerator and retrieve status information, allowing the customer to know if he should pick up an extra pint of milk.

In the above contexts and many others that can be envisioned by persons having skill in the art, recipients of these messages sent by such machines can be other machines which can filter and deal with them, or they can be devices wherein the message is designed to be read by humans. Some such messages could be designed to be sent to an individual, a group of individuals representing an entity, or a machine owned by the entity directly. Furthermore, any individual might wish to receive such messages at multiple devices, such as a PC, a tablet and a phone. Accordingly, the recipient may wish to receive the messages without the sending machine being aware of specific network-identifying information relating to the recipient's device, such as its mobile telephone number or its network (e.g., Internet Protocol or IP) address, or its email address. It may, instead wish to receive messages sent by machines that only know the recipient's name, and it may wish to receive only such messages as qualify under a particular set of rules or algorithm for delivery, in order to maintain the recipient's privacy.

In another contemplated aspect, businesses or individuals will enable multiple mobile devices/machines through subscriptions with wireless providers who can add mobile device numbers or other identifying information to Directory Assistance at the request of the master subscriber. The master subscriber can define for the wireless provider when and how to allow privacy-protected access to others. Which party pays (subscriber or requestor) will be determined by contract or a public fee schedule.

These transactions can be mobile or non-mobile device/machine to mobile subscribing consumer (person), mobile or non-mobile device/machine to mobile or non-mobile device/machine or machines or mobile subscribing consumer (person) to mobile or non-mobile device/machine or machines. At present, only the telecommunication carriers can efficiently provide the information flow required by this service on a permission basis and through a cross-industry database or clearinghouse approach; however, the present invention is not limited to the use of telecommunication carriers. Subscription service providers may contract with telecommunication carriers for access to subscribers or the telecommunication carriers may be utilized by the subscription services and subscribers via the subscribers pre-existing contract with the telecommunication carriers. In other words, the carriers would transmit the predefined, privacy-brokered transactions as they would any other communication.

The preceding and following merely illustrate the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions.

Moreover, all statements herein reciting principles and aspects of the disclosure, as well as specific examples thereof, are intended to encompass both structural and functional equivalents thereof. Additionally, it is intended that such equivalents include both currently known equivalents as well as equivalents developed in the future, e.g., any elements developed that perform the same function, regardless of structure.

Thus, for example, it will be appreciated by those skilled in the art that any block diagrams herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown.

The functions of the various elements shown in the Figures, including any functional blocks labeled as "processors," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

Unless otherwise explicitly specified herein, the drawings are not drawn to scale.

Referring to the drawings wherein identical reference numerals denote the same elements throughout the various views, FIG. 1 shows a first aspect of a system that allows a mobile or non-mobile device/machine to communicate with another mobile or non-mobile device/machine automatically in a privacy-protected transaction. As discussed above, these can be used in many operational contexts, i.e., for consumers and for business.

The system includes a Cross-Industry Database (30) of subscriber information. Subscribers (10), through their respective carrier (20) or directly with the Cross-Industry Database (30), register to have their subscriber identifying information contained in the database. As part of the registration process, each subscriber sets individualized privacy settings (e.g., PS-X, PS-Y, PS-A, etc.) which range from no privacy (transmit all messages-no filter) to complete privacy (bar all transmissions). Depending on the specific privacy settings of the subscriber, transmissions from recognizable devices or machines (40) may be routed and automatically sent to the subscriber on his/her/its mobile or non-mobile device/machine. Privacy settings may also include information about the times of day when messages may be sent, to allow workers to receive messages only at times when they are working. Privacy settings may also include "scoring," wherein messages are scored a number of points based on matching certain characteristics, and only messages above a certain score are sent to the device. For example, a message is received from a member of the corporate security team (+10 points), from a device owned by corporate (+10 points) but from a location which is not a corporate office building (−10 points). The overall score is +10 points, and the policy is to accept all messages over +5 points, and therefore the message is accepted.

The Cross-Industry Database (30) may have such information, associated with machines, such as owner, user, type of device, purpose, description, geographic location, other connected devices, family members, lead person on same family plan as device, asset number, employee number, employee job title, employee department, responsible person, business owner, office location, remaining lifespan, cost/value of the device, contract number, lessee, lessor, maintenance contact, lease expiration date, battery status, fault status, maintenance schedule, theft status, theft reference number, past locations, past owners, and maintenance history. These fields are exemplary only and not intended to be limiting, nor are all such fields required. Sender machines can specify these fields to be searched in the clearinghouse when attempting to send a message. For example, a machine may have access to information about the owner of its own network or internet connection, and may be programmed to send messages to all other devices owned by that same owner, when a certain event occurs or condition changes.

A machine (40) has rules pre-programmed within it about whom to contact under certain conditions. These rules may have been programmed in to it when the machine was assembled, or at some later point. An example of such a rule may be "contact all field engineers for the company when failure is detected" or "contact all devices owned by [company] that are presently at [location] that are held by members of [department]." The message constructed to send to the clearinghouse will be in a pre-defined format specified by the clearinghouse and include each identifying characteristic implied by the rule, e.g., "role:" "field engineers" and "company:" "XYZ Limited." Furthermore, the message may specify which of these characteristics are optional, and which are mandatory, for the purpose of searching for recipients. The protocol for the format of the messages can be predetermined or it can be communicated to the devices once the device locates the clearinghouse. For example, messages can be sent to the clearinghouse in JSON format describing a single object with at least one property with the name "Identifiers," which is a dictionary (in the form of an object) encoding a series of Tuples of {Characteristic Name, Characteristic Value}. To preserve privacy and security, the sending machine does not have machine addressing information, such as a telephone number, cellular device ID number, IP address, MAC address, domain name, subdomain name, or network name, and does not have recipient addressing information such as electronic mail address or userID. The sending machine therefore must send its messages through the Clearinghouse in order to reach the recipient machine, since it does not have information sufficient to reach the recipient machine directly.

The transmission (45) is routed either through the particular carrier (20) or directly to a Cross-Industry Database (30). The transmission carries with it the mobile or non-mobile device/machine identifying criteria of the device or machine sending the transmission. The Cross-Industry Database (30) receives the transmission and searches (35) the database for subscribers that have privacy settings which would allow the consumer or business transmission to be received. The Cross-Industry Database (30) then identifies the registered subscribers who are receptive to the consumer or business transmission and connectivity (25) is established through the recipient's carrier. Connectivity may be a telephone call, a SMS (text) message, e-mail or any other form of digital or encrypted transmission.

Figure 2:
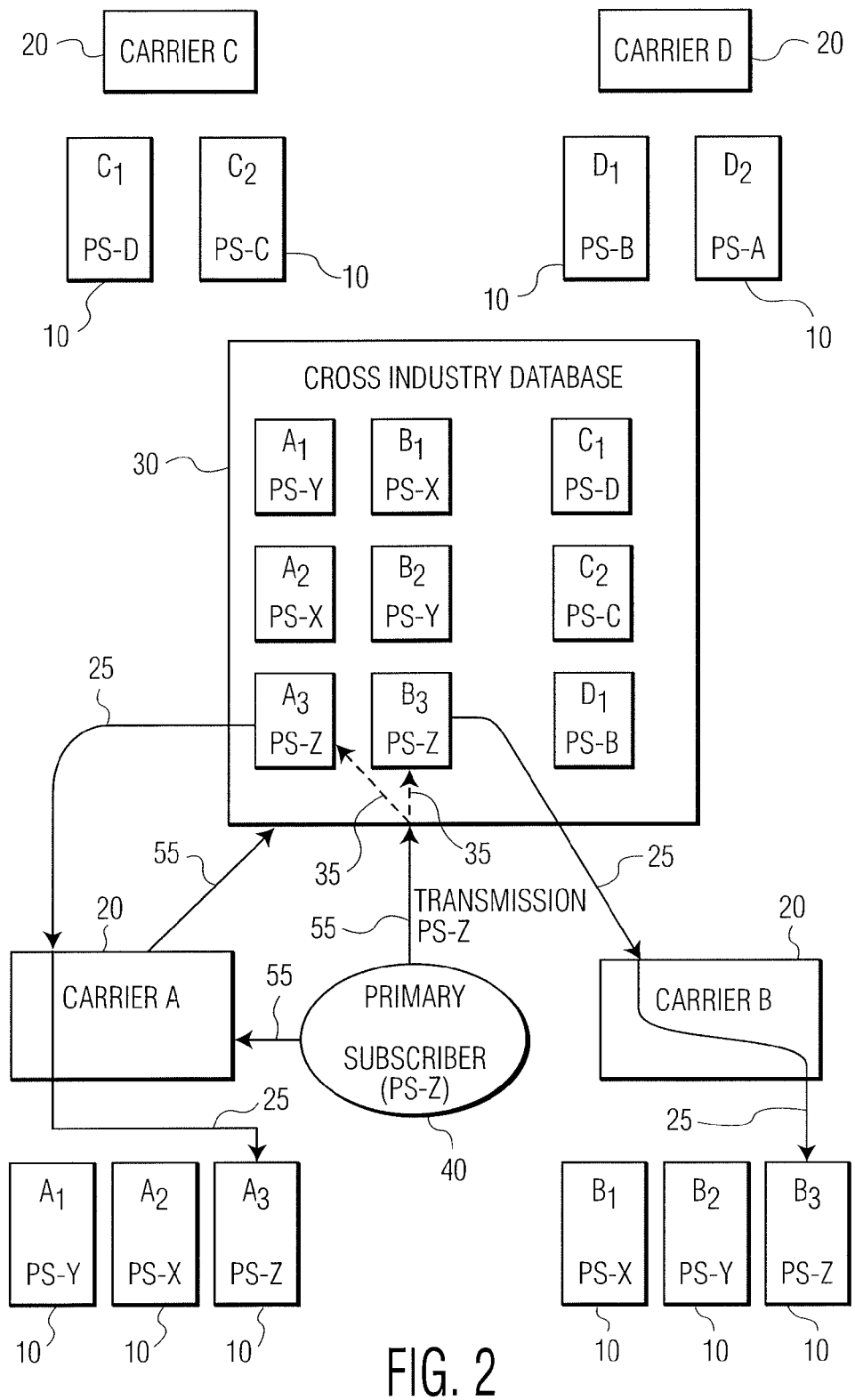
FIG. 2 is a depiction of the architecture according to an alternate aspect of the present invention.

Referring to the drawings, FIG. 2 shows another aspect of a system that allows a mobile or non-mobile device/machine to communicate with another mobile or non-mobile device/machine automatically in a privacy-protected transaction.

As with FIG. 1, the system includes a Cross-Industry Database (30) of subscriber information. Subscribers (10), through their respective carrier (20) or directly with the Cross-Industry Database (30), register to have their subscriber identifying information contained in the database. As part of the registration process, each subscriber sets individualized privacy settings (e.g., PS-X, PS-Y, PS-A, etc.) which range from no privacy (transmit all messages-no filter) to complete privacy (bar all transmissions). Depending on the specific privacy settings of the subscriber, transmissions from recognizable devices or machines (40) may be routed and automatically sent to the subscriber on his/her/its mobile or non-mobile device/machine.

As such, the Primary Subscriber (50), through his/her/its preprogrammed device or machine, transmits a message in search of intended recipients. The transmission (55) is routed either through the particular carrier (20) or directly to a Cross-Industry Database (30). The transmission carries with it the mobile or non-mobile device/machine identifying criteria of the device or machine sending the transmission. The Cross-Industry Database (30) receives the transmission and searches (35) the database for subscribers that have privacy settings which would allow the Primary Subscriber's transmission to be received. The Cross-Industry Database (30) then identifies the registered subscribers who are receptive to the Primary Subscriber's transmission and connectivity (25) is established through the recipient's carrier. Connectivity may be a telephone call, a SMS (text) message, e-mail or any other form of digital or encrypted transmission.

Figure 3:
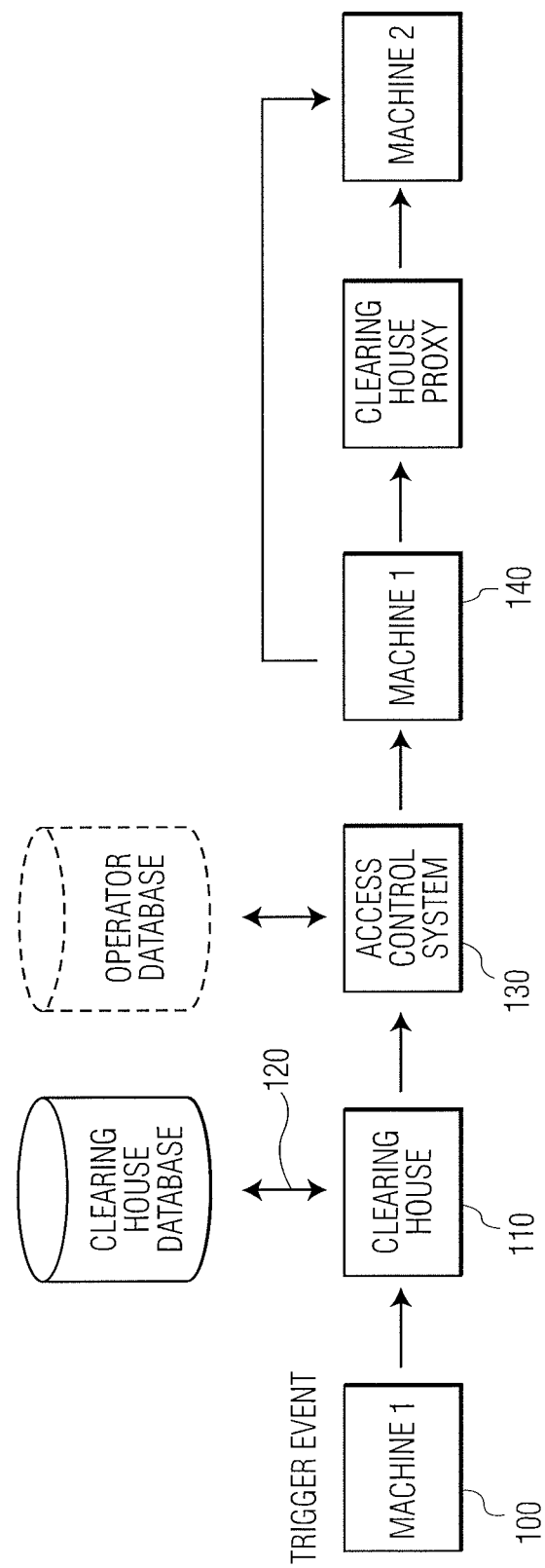
FIG. 3 is a flow diagram according to an aspect of the present invention.

Referring now to FIG. 3, a flow chart of the method of an aspect of the present invention is shown. In step 100, an event occurs at a first machine to trigger a need to send a message to a second machine.

In step 100, a first machine (in this example, a first machine is an embedded Industrial Control System belonging to a company) needs to send an alert to the company's central reporting system. In step 110, the first machine 1 contacts a clearinghouse at a pre-programmed network address or through a service discovery mechanism, such as Bonjour or Avahi, hosted by the carrier. The first machine is specially programmed to know that it must, from time to time, send messages of this type through a clearinghouse, but may or may not be programmed in advance to know the clearinghouse's physical or network location or its messaging protocol. Contact with the clearinghouse can be made by any number of messaging protocols either now known or created in the future, for example, via SMS or over the internet. Different messaging protocols can be chosen based on their strengths and weaknesses, including cost or reliability. The particular messaging protocol is not a core portion of this aspect of the invention.

In an exemplary embodiment, a clearinghouse is established in the form of a number of servers and is interfaced with one or more wireless network's customer databases. This connection could be by any means, but would likely be between the servers of the clearinghouse and a carrier database server, or application programming interface, or similar by via a high speed wired connection, utilizing a virtual private network—acceptable methods would be specified by each network operator.

The clearinghouse provides the processing capabilities required to a) accept message and notification requests from third parties, including machines and devices hosted on any internet or messaging network connection, regardless of whether their network operator is part of the scheme; b) interface with the carrier networks to prosecute queries; and, c) interpret the properties associated with the source of the message, and the destination machine, to determine if the message or notification should be forwarded or rejected.

In step 120, the clearinghouse consults its database to determine the location of the right destination machine. Alternatively, the clearinghouse can request that one or more cellular carriers or other holders of machine network address information (e.g., telephone numbers or IP addresses) (herein referred to as "carriers") process the searches. In step 130, the clearinghouse uses the access rules associated with the second machine to determine if the first machine should be permitted to send messages to the second machine. The access rules can be default rules set up by the carrier, or can be specific, types of rules set up by the owner of the machine. For example, the owner of the machine may wish to set up a rule that machines owned by him will only accept messages from other machines owned by him. In the event the rules call for it, the second machine may request that the clearinghouse contact a cellular operator providing service to the first machine to authenticate that the first machine belongs to the company, before accepting messages from the first machine.

A user is signed up for service from the clearinghouse by his/her/its network connectivity provider, e.g., the user's cellular carrier. Each device connected to the messaging network will have a profile, possibly as part of a group or corporate account. The clearinghouse will provide a method, either directly or via the network connectivity provider, to configure the access policy for each profile or group through a web based interface or via a managed service. Configuration options will include which type of messages and senders should be allowed to reach each device connected to the messaging network, and the properties associated with each device. Some of these properties, such as location and power state, will be automatically updated either by the machine or the messaging network to which it is connected.

If there is a machine that matches the first machine's request criteria, and also is willing to accept a message from the first machine, the system proceeds to Step 140 wherein the first machine is sent the information it needs to contact the second machine, either directly via a messaging protocol, or alternatively via a proxy system through the clearinghouse or another provider.

A machine owned by a third party can place a request to the clearinghouse, asking for a connection to another machine with specific characteristics. These characteristics may include ownership and location, for example a bulldozer owned by a named company in a particular state. Receipt of the request may be via SMS or any other messaging network, including internet based messaging networks such as SMTP or XMPP. The clearinghouse will distribute the search for a suitable machine to each participating network, passing on the necessary information for the search to be conducted. Alternatively, the search may be conducted on the clearinghouse's own servers using aggregated information supplied by the carriers.

From the list of returned matches, the clearinghouse will select the best match, or possibly multiple matches depending on the search. It will be understood by persons having skill in the art that there might be more than one recipient machine that will receive the message. The clearinghouse uses rules provisioned by the owner of the recipient machines, or another authorized party such as the network owner, to determine if this connection should be made and if so under what conditions. Criteria for permitting connections may include but are not limited to the current location of both the third party and the recipient machine, the owner of the third party machine, and the time the connection was attempted.

If permitted, the clearinghouse creates the connection either by providing contact details only to machines permitted to connect, or by proxying the connection in such a way that information can be exchanged between parties without one or both parties ever being able to determine the address of the recipient. The choice of the connection or notification method is based on the rules provisioned by the owner of the recipient machines, or another authorized party such as the network owner.

In the case where the clearinghouse passes the network address to the third party, the third party makes the connection directly and the involvement of the clearinghouse is at an end. In the case where the clearinghouse creates a proxy connection, all messages are sent to the clearinghouse to be forwarded on to the recipient, until one of the participants terminates the connection or supplies a direct address for the other party to convert the connection to a direct connection. Creation of the connection may be dependent on one or more of the parties paying a fee, as determined by the properties associated with the recipient.

A proxy would be used in order to permit the first machine to communicate with the second machine without ever being made aware of any addressing information relating to the second machine. The clearinghouse proxy operates like a standard message proxy and is only of interest in conjunction with the rest of the system in that it removes the need to share the actual network address of a given machine.

The message also can contain further information relating to the identity of the first machine, its owner and/or its geographic location, which information can come from the carrier and/or from the first machine itself. Geographic information can come from an embedded global positioning chip, from cellular triangulation, and/or from internet/WiFi location systems. Such information could be cryptographically signed for protection before being included in the message and sent to the second machine.

Upon receiving the message, the second machine may optionally apply its own security policies, which may be separate and apart from the rules at the clearinghouse or the carrier database. The second machine will then be able to read the message, and may present it visually for human consumption, or act on it based on parsing its contents (e.g., text or machine readable instructions). The machine may also include machine readable instructions for contacting the first machine, so that further information can be exchanged without the clearinghouse. This information can include a telephone number or an IP address. On the other hand, the instructions may be to continue the exchange via the clearinghouse or some other proxy or intermediary. Persons having skill in the art could implement this type of a proxy in a manner similar to internet proxies which are known in the art. The clearinghouse or another services provider could also provide a temporary telephone number for future communications, rather than provide the first machine's permanent telephone number. When communication with the first machine via such an intermediary, location information about the second machine can be deleted from outgoing communications, allowing the first machine and the second machine to carry on a conversation without either machine knowing where the other is located, either geographically or logically on the network.

Figure 4:
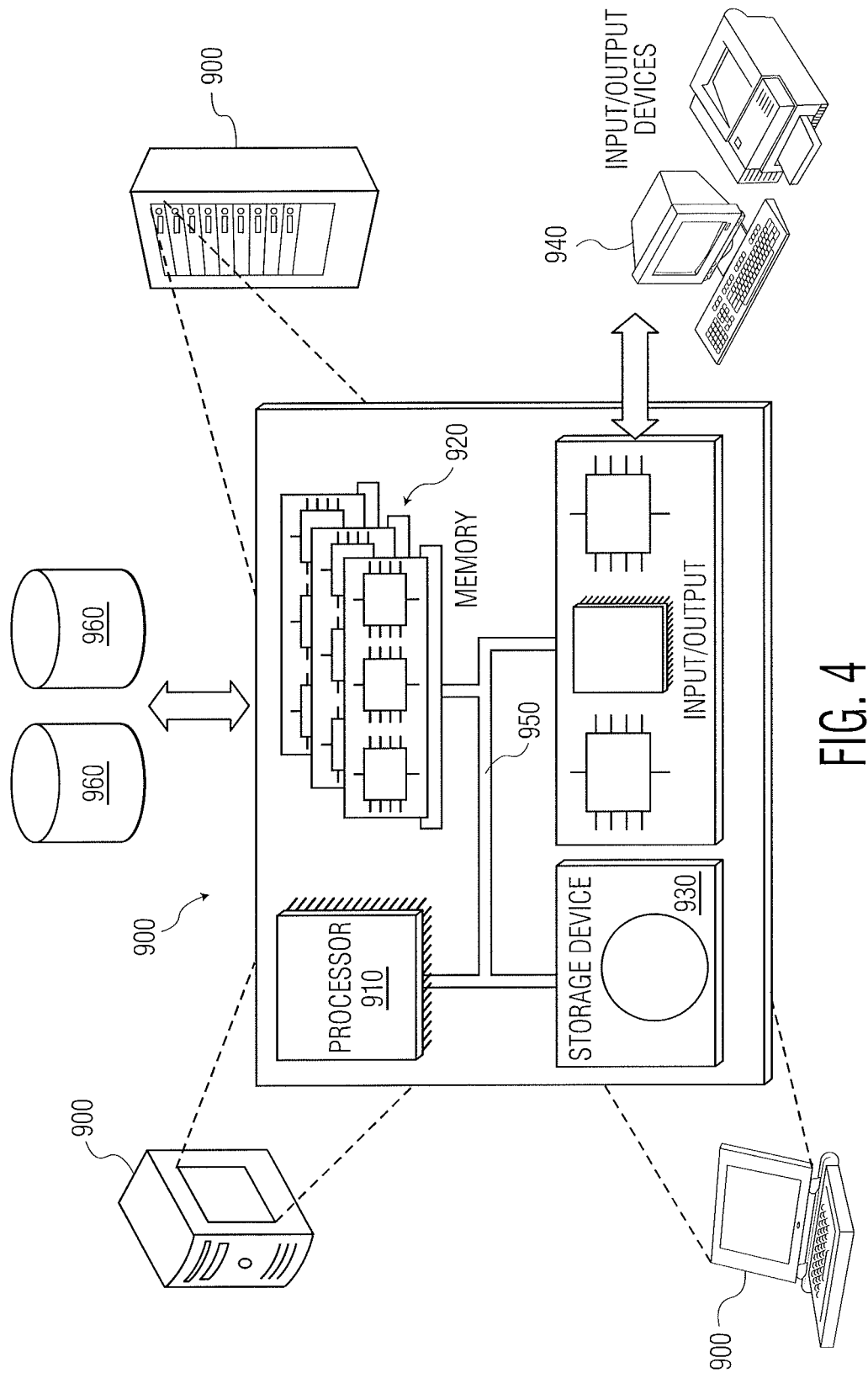
FIG. 4 is a diagram displaying a general purpose computer on which the system and method of the present disclosure may be implemented according to an aspect of present disclosure.

FIG. 4 is a diagram displaying a general purpose computer on which the system and method of the present disclosure may be implemented according to an aspect of present disclosure. The computer system 900 may execute at least some of the operations described above. Computer system 900 may include processor 910, memory 920, storage device 930, and input/output devices 940. Some or all of the components 910, 920, 930, and 940 may be interconnected via system bus 950. Processor 910 may be single or multi-threaded and may have one or more cores. Processor 910 may execute instructions, such as those stored in memory 920 or in storage device 930. Information may be received and output using one or more input/output devices 940.

Memory 920 may store information and may be a computer-readable medium, such as volatile or non-volatile memory. Storage device 930 may provide storage for system 900 and may be a computer-readable medium. In various aspects, storage device 930 may be a flash memory device, a floppy disk device, a hard disk device, an optical disk device, or a tape device.

Input/output devices 940 may provide input/output operations for system 900. Input/output devices 940 may include a keyboard, pointing device, and microphone. Input/output devices 940 may further include a display unit for displaying graphical user interfaces, speaker, and printer. External data, such as financial data, may be stored in accessible external databases 960.

The features described may be implemented in digital electronic circuitry, or in computer hardware, firmware, software, or in combinations thereof. The apparatus may be implemented in a computer program product tangibly embodied in an information carrier, e.g., in a machine-readable storage device or in a propagated signal, for execution by a programmable processor; and method steps may be performed by a programmable processor executing a program of instructions to perform functions of the described implementations by operating on input data and generating output.

The described features may be implemented in one or more computer programs that are executable on a programmable system including at least one programmable processor coupled to receive data and instructions from, and to transmit data and instructions to, a data storage system, at least one input device, and at least one output device. A computer program may include set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors of any kind of computer. Generally, a processor may receive instructions and data from a read only memory or a random access memory or both. Such a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable, disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user may provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks may include, e.g., a LAN, a WAN, and the computers and networks forming the Internet.

The computer system may include clients and servers. A client and server may be remote from each other and interact through a network, such as the described one. The relationship of client and server may arise by virtue of computer programs running on the respective computers and having a client-server relationship to each other.

At this point, while we have discussed and described the disclosure using some specific examples, those skilled in the art will recognize that our teachings are not so limited. Accordingly, the disclosure should be only limited by the scope of the claims attached hereto.

The invention claimed is:

1. A method of sending a message from a first machine to a second machine, the second machine having second machine addressing information unknown to the first machine, the method comprising the steps of:
   a) storing in a database an association between sender information relating to the identity of the first machine and recipient information relating to the second machine, the database containing, for a plurality of machines, machine characteristic information, machine addressing information, and a security rule for the second machine;
   b) without user action, composing the message based on a conditional rule, at the first machine, the message comprising the sender information and the recipient information, but not including second machine addressing information and not including recipient addressing information, and a message payload;
   c) transmitting the message to an intermediary server, the intermediary server in communication with the database;
   d) authenticating the sender information relating to the identity of the first machine at the intermediary server;
   e) querying the database and comparing the recipient information to the machine characteristic information to identify the second machine; and
   f) transmitting the message payload to the identified second machine, wherein the message payload is transmitted according to the security rule associated with the second machine.

2. The method of claim 1, wherein the sender information comprises sender owner information.

3. The method of claim 1, wherein the sender information comprises information relating to the geographic location of the first machine.

4. The method of claim 1, wherein the recipient information comprises recipient owner name information.

5. The method of claim 1, wherein the recipient information comprises recipient operator name information.

6. The method of claim 1, wherein the recipient information comprises recipient job title information.

7. The method of claim 1, wherein the machine addressing information is a telephone identifier.

8. The method of claim 1, wherein the machine addressing information is from the group consisting of: an Internet Protocol address, a MAC address and a network name.

9. The method of claim 1, wherein the intermediary server is controlled by a wireless telephone carrier.

10. The method of claim 1, wherein the intermediary server is an industry clearinghouse.

11. The method of claim 10, wherein the database is controlled by a clearinghouse provider.

12. The method of claim 10, wherein the database is controlled by a wireless telephone carrier.

13. The method of claim 1, wherein said sender information further comprises continuing contact information sufficient to enable the second machine to send a message to the first machine.

14. The method of claim 13, wherein said continuing contact information is a permanent telephone identifier.

15. The method of claim 13, wherein said continuing contact information is a temporary telephone number.

16. The method of claim 13, wherein said continuing contact information identifies a proxy for further communication.

17. The method of claim 1, wherein the security rule lists the sender information for approved senders authorized to send messages to the second machine.

18. The method of claim 1, wherein the machine characteristic information relates to the owner of the second machine.

19. The method of claim 1, wherein the machine characteristic information relates to the identity of the user of the second machine.

20. The method of claim 1, wherein the machine characteristic information relates to work information relating to a user of the second machine.

21. The method of claim 1, wherein the machine characteristic information relates to the geographic location of the second machine.

22. The method of claim 1, wherein the security rule lists times when messages can be delivered.

23. The method of claim 1, wherein the security rule lists one or more locations such that the second machine will only accept messages when at a listed location.

* * * * *